(12) United States Patent
DeWitt, Jr. et al.

(10) Patent No.: US 8,516,462 B2
(45) Date of Patent: Aug. 20, 2013

(54) METHOD AND APPARATUS FOR MANAGING A STACK

(75) Inventors: Jimmie Earl DeWitt, Jr., Georgetown, TX (US); Riaz Y. Hussain, Austin, TX (US); Frank Eliot Levine, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1831 days.

(21) Appl. No.: 11/539,699

(22) Filed: Oct. 9, 2006

(65) Prior Publication Data

US 2008/0189488 A1 Aug. 7, 2008

(51) Int. Cl.
*G06F 9/45* (2006.01)

(52) U.S. Cl.
USPC .......................... 717/151; 717/158; 718/104

(58) Field of Classification Search
None
See application file for complete search history.

(56) References Cited

U.S. PATENT DOCUMENTS

| | | | |
|---|---|---|---|
| 5,953,530 A | 9/1999 | Rishi et al. | |
| 6,247,121 B1 | 6/2001 | Akkary et al. | |
| 6,587,967 B1 | 7/2003 | Bates et al. | |
| 6,594,774 B1 | 7/2003 | Chapman et al. | |
| 6,604,131 B1 * | 8/2003 | Warris et al. | 709/205 |
| 6,842,898 B1 | 1/2005 | Carlson et al. | |
| 6,938,254 B1 * | 8/2005 | Mathur et al. | 718/104 |
| 6,968,557 B1 * | 11/2005 | Zhang et al. | 719/319 |
| 6,981,261 B2 | 12/2005 | Kalafatis et al. | |
| 7,000,150 B1 | 2/2006 | Zunino et al. | |
| 7,028,298 B1 * | 4/2006 | Foote | 718/104 |
| 7,086,060 B2 * | 8/2006 | Hahn | 718/104 |
| 7,496,615 B2 * | 2/2009 | Broussard | 707/999.206 |
| 7,624,395 B2 * | 11/2009 | Dostert | 718/1 |
| 7,730,460 B1 * | 6/2010 | Warren et al. | 717/133 |
| 2002/0046204 A1 * | 4/2002 | Hayes | 707/1 |
| 2004/0019744 A1 * | 1/2004 | Boucher | 711/132 |
| 2004/0034742 A1 * | 2/2004 | Field et al. | 711/132 |
| 2005/0010667 A1 * | 1/2005 | Moriki et al. | 709/226 |
| 2005/0097262 A1 * | 5/2005 | Falsett et al. | 711/100 |
| 2005/0262504 A1 * | 11/2005 | Esfahany et al. | 718/1 |
| 2005/0262505 A1 * | 11/2005 | Esfahany et al. | 718/1 |
| 2007/0150868 A1 * | 6/2007 | Wu et al. | 717/124 |
| 2010/0031270 A1 * | 2/2010 | Wu et al. | 718/107 |

FOREIGN PATENT DOCUMENTS

| | | |
|---|---|---|
| JP | 11234274 A | 8/1999 |
| JP | 2003202965 A | 7/2003 |

OTHER PUBLICATIONS

QNX Software Systems, "QNX Momentics Development Suite V6.3 Integrated Development Enviornment User's Guide", Jan. 2005, http://www.qnx.com/download/feature.html?programid=9328.*

* cited by examiner

*Primary Examiner* — Chat Do
*Assistant Examiner* — Jue Wang
(74) *Attorney, Agent, or Firm* — Yee & Associates, P.C.; David A. Mims, Jr.

(57) ABSTRACT

A computer implemented method, apparatus, and computer usable program code for monitoring and managing a stack. Usage of stack space is monitored for a plurality of threads. Usage of stack space is compared to a policy to form a comparison. An action is selectively initiated based on the comparison to the policy.

18 Claims, 4 Drawing Sheets

METHOD AND APPARATUS FOR MANAGING A STACK

BACKGROUND OF THE INVENTION

1. Field of the Invention

The present invention relates generally to an improved data processing system and in particular to a method and apparatus for managing the use of data structures. Still more particularly, the present invention relates to a computer implemented method, apparatus, and computer usable program code for managing the use of a stack.

2. Description of the Related Art

In processing data, programs typically use a stack to store data on a temporary basis. A stack is a memory area in which data may be stored. Typically, a stack has two basic operations, a push and a pop. A push adds information or data to the top of a stack and a pop removes the data from the top of the stack. Stacks are also used to allocate storage for local variables, that is, variables which are used only while a routine is active. A stack is usually created in a section of memory with a fixed origin and a variable size. Although the size of the stack may be increased or decreased, stacks typically have maximum size limits. As a result, depending on the usage, a data processing system may run out of stack space for a given thread or process.

Currently, mechanisms are present to determine when stack space has been completely used. Currently used mechanisms include hardware detection, such as a page fault occurring when stack space in unavailable. These types of solutions usually provide a notification when stack space has actually run out and may dynamically increase the stack size until the maximum allowable size is reached.

SUMMARY OF THE INVENTION

The present invention provides a computer implemented method, apparatus, and computer usable program code for monitoring and managing a stack. Usage of stack space is monitored for a plurality of threads. Usage of stack space is compared to a policy to form a comparison. An action is selectively initiated based on the comparison to the policy.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
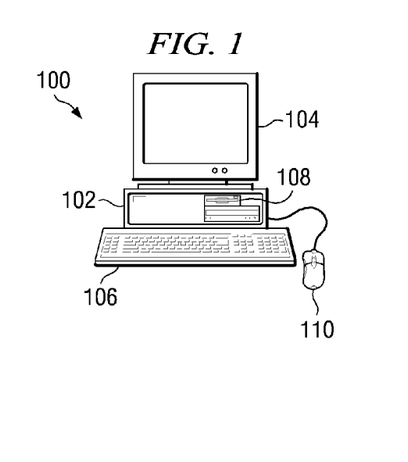
FIG. 1 is a pictorial representation of a data processing system in which illustrative embodiments may be implemented.

With reference now to the figures and in particular with reference to FIG. 1, a pictorial representation of a data processing system is shown in which illustrative embodiments may be implemented. Computer 100 includes system unit 102, video display terminal 104, keyboard 106, storage devices 108, which may include floppy drives and other types of permanent and removable storage media, and mouse 110. Additional input devices may be included with personal computer 100. Examples of additional input devices include a joystick, touchpad, touch screen, trackball, microphone, and the like.

Figure 2:
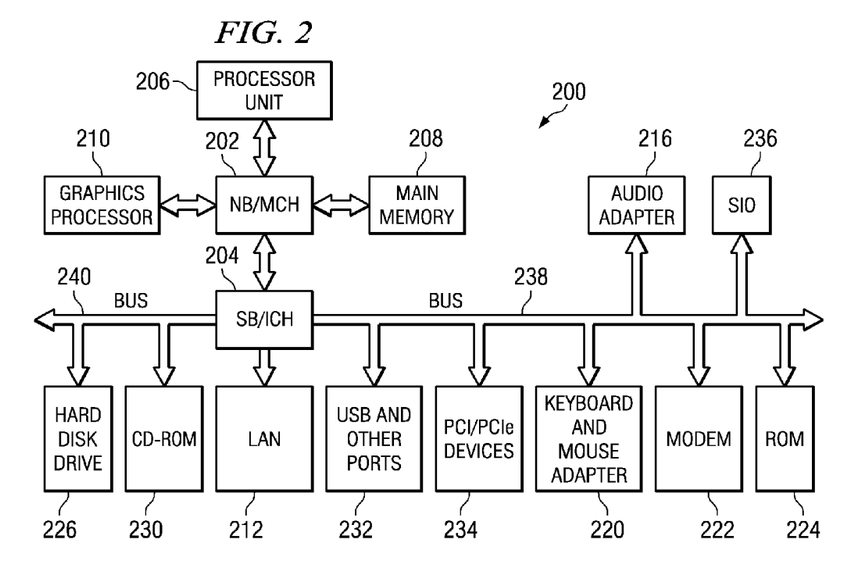
FIG. 2 depicts a block diagram of a data processing system in which illustrative embodiments may be implemented.

Computer 100 may be any suitable computer, such as an IBM® eServer™ computer or IntelliStation® computer, which are products of International Business Machines Corporation, located in Armonk, N.Y. Although the depicted representation shows a personal computer, other embodiments may be implemented in other types of data processing systems. For example, other embodiments may be implemented in a network computer. Computer 100 also preferably includes a graphical user interface (GUI) that may be implemented by means of systems software residing in computer readable media in operation within computer 100. Next, FIG. 2 depicts a block diagram of a data processing system in which illustrative embodiments may be implemented. Data processing system 200 is an example of a computer, such as computer 100 in FIG. 1, in which code or instructions implementing the processes of the illustrative embodiments may be located.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204, audio adapter 216, keyboard and mouse adapter 220, modem 222, read only memory (ROM) 224, universal serial bus (USB) ports, and other communications ports 232. PCI/PCIe devices 234 are coupled to south bridge and I/O controller hub 204 through bus 238. Hard disk drive (HDD) 226 and CD-ROM drive 230 are coupled to south bridge and I/O controller hub 204 through bus 240.

PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204. An operating system runs on processor 206. This operating system coordinates and controls various components within data processing system 200 in FIG. 2. The operating system may be a commercially available operating system, such as Microsoft® Windows XP®. (Microsoft® and Windows XP® are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java-based trademarks are trademarks of Sun Microsystems, Inc. in the United States, other countries, or both.

Instructions for the operating system, the object-oriented programming system, and applications or programs are located on storage devices, such as hard disk drive 226. These instructions and may be loaded into main memory 208 for execution by processor 206. The processes of the illustrative embodiments may be performed by processor 206 using computer implemented instructions, which may be located in a memory. An example of a memory is main memory 208, read only memory 224, or in one or more peripheral devices.

The hardware shown in FIG. 1 and FIG. 2 may vary depending on the implementation of the illustrated embodiments. Other internal hardware or peripheral devices, such as flash memory, equivalent non-volatile memory, or optical disk drives and the like, may be used in addition to or in place of the hardware depicted in FIG. 1 and FIG. 2. Additionally, the processes of the illustrative embodiments may be applied to a multiprocessor data processing system.

The systems and components shown in FIG. 2 can be varied from the illustrative examples shown. In some illustrative examples, data processing system 200 may be a personal digital assistant (PDA). A personal digital assistant generally is configured with flash memory to provide a non-volatile memory for storing operating system files and/or user-generated data. Additionally, data processing system 200 can be a tablet computer, laptop computer, or telephone device.

Other components shown in FIG. 2 can be varied from the illustrative examples shown. For example, a bus system may be comprised of one or more buses, such as a system bus, an I/O bus, and a PCI bus. Of course the bus system may be implemented using any suitable type of communications fabric or architecture that provides for a transfer of data between different components or devices attached to the fabric or architecture. Additionally, a communications unit may include one or more devices used to transmit and receive data, such as a modem or a network adapter. Further, a memory may be, for example, main memory 208 or a cache such as found in north bridge and memory controller hub 202. Also, a processing unit may include one or more processors or CPUs.

The depicted examples in FIG. 1 and FIG. 2 are not meant to imply architectural limitations. In addition, the illustrative embodiments provide for a computer implemented method, apparatus, and computer usable program code for compiling source code and for executing code. The methods described with respect to the depicted embodiments may be performed in a data processing system, such as data processing system 100 shown in FIG. 1 or data processing system 200 shown in FIG. 2.

The different embodiments recognize that, when stack space is unavailable, various undesired results may occur. For example, an application may stop execution. Entries may be rewritten within the stack resulting in incorrect results. Further, a slow down due to the overuse of virtual memory and paging in the execution of applications also may occur.

The illustrative embodiments provide a computer implemented method, apparatus, and computer usable program code for managing stacks. Information about usage of space in the stack for programs is monitored. A determination is made as to whether a condition is present that indicates that a complete use of the stack space is likely to occur. If the usage of space in a stack meets some threshold criteria for stack usage, the condition exists and an action is initiated to prevent complete usage of the stack space.

In the illustrative embodiments, the usage of stack space by threads is monitored. Stack space usage is monitored and information on the usage is collected to provide historical information and form a policy to make runtime configuration decisions. These usage statistics are compared to a policy to make the runtime decisions. An action is selectively initiated based on the comparison to the policy to prevent usage of all of the stack space. The policy is a set of rules that specify what actions to take depending on the usage of the stack space. For example, the policy may be comprised of a rule that states that the stack space should be increased in size if the usage by a particular thread exceeds a certain percentage of the stack space. In these examples, the process stack space is the stack space allocated for use by one or more threads or simply all threads in a process.

Stack sizes and stack usage for threads are monitored in the illustrative embodiments. For example, the stack size for dispatched threads is monitored. By looking at the stack size when a thread is being dispatched out, the stack size being used by all threads may be tracked. By checking stack utilization and the limit to the stack size, an identification of when stack space will run out may be projected. A condition in which stack space will run out may be identified, in these examples, using thresholds. A threshold may be, for example, when a certain amount of stack space is left or when a certain percentage of stack space is left.

With these notifications, the stack space may be increased in size or other actions may be taken. For example, an application may be stopped or a particular thread may be stopped until additional stack space is available to avoid running out of stack space. Further, the increase or decrease of a stack size for a stack space may be performed based on usage patterns. For example, when a selected application is started, a prior usage pattern may indicate that a certain stack size is required for a particular process or thread. In a similar manner, if less stack space is needed for applications running, the stack space may be reduced to increase the amount of memory available for other uses.

Figure 3:
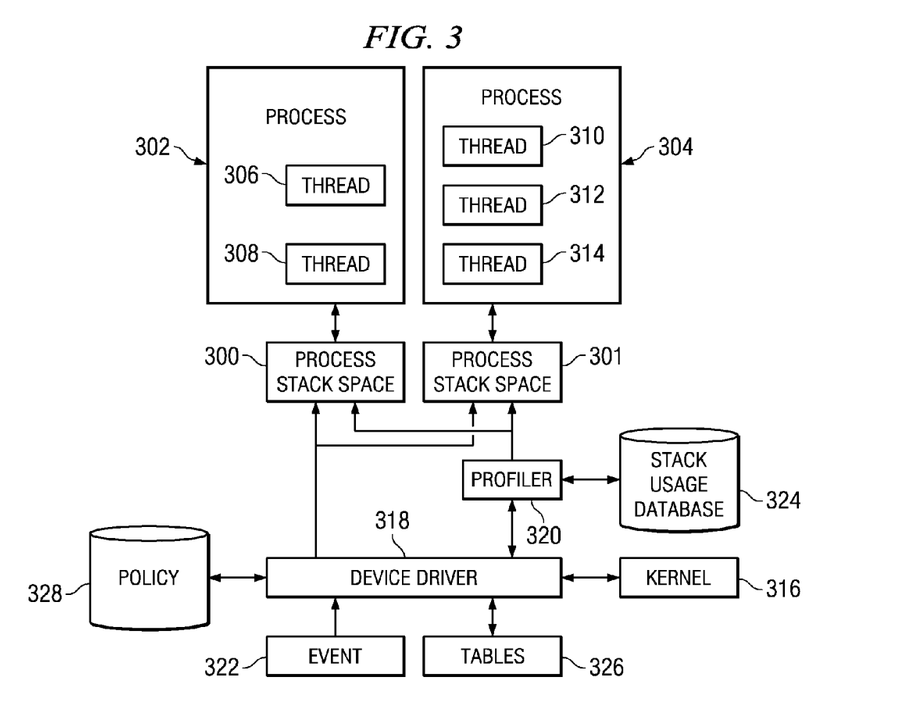
FIG. 3 is diagram illustrating components used in managing stack sizes in accordance with an illustrative embodiment.

Turning now to FIG. 3, a diagram illustrating components used in managing stack sizes is depicted in accordance with an illustrative embodiment. Process stack space 300 and 301 contain stacks for threads that include a call stack as well as other information stored on a temporary basis for processes 302 and 304. In this example, process stack space 300 is associated with process 302, and process stack space 301 is associated with process 304. A stack is usually represented as a block of memory cells or entries with a fixed location at one end and a stack pointer holding the address of the current entry at the other in a stack.

In these examples, process stack space 300 and 301 contain all of the space or memory for the different application stacks. Each thread in these examples is assigned or given stack space located within process stack space 300 or 301. For example, thread 306 is assigned stack space within process stack space 300, while thread 310 is assigned to stack space within process stack space 301. The stack space is used for different stack, such as an application stack or a call stack. In these examples, the stack is a call stack. Of course, the different embodiments may be applied to managing more than one stack within the stack space for a thread. For each thread, the call stack contains the information required to return to previous callers and includes the information regarding calling sequence.

In these examples, a call stack is used to track the point in which a subroutine should return to control when it finishes executing. For example, if one subroutine calls another subroutine, when the second subroutine finishes executing, the called subroutine needs to know where to return to continue execution. In other words, a call stack includes a location of an instruction to return to when the called subroutine returns. A stack also may serve additional functions, such as storing local variables and passing parameters. Stacks may also be used to save registers when an interrupt is being processed.

In these examples, process 302 contains threads 306 and 308. Each of these threads use process stack space 300 during the execution of the threads. Process 304 contains threads 310, 312, and 314. These threads use process stack space 301.

In the illustrative examples, kernel 316, device driver 318, and profiler 320, are components used to manage process stack space 300 and 301. The change in stack space in these examples is for the individual stack space assigned to threads, rather than process stack space 300 and 301. Depending on the particular implementation, adjustments to the size of process stack space 300 and 301 also may be made. In these illustrative examples, the management of process stack space 300 and 301 include monitoring the usage of stack space as well as changing the size of process stacks for threads in process stack space 300 and 301 based on monitored usage.

In these examples, the monitoring of threads 306, 308, 310, 312, and 314 is performed by device driver 318. In response to receiving event 322, device driver 318 initiates a collection of data regarding usage of stack space by threads of interest in process stack space 300 and process stack space 301. The actual stack space from which information is collected depends on the particular thread.

The threads of interest may be threads selected by a user or threads selected by some other criteria. The other criteria may be, for example, a thread or threads associated with the event or the threads may be all threads associated with the particular process. In these examples, events may take various forms. For example, event 322 may be a timer interrupt or some other interrupt received by device driver 318. Event 322 may also be an indication that an application is loaded, a thread has been created, or a dispatch has occurred. Another example of an event that may initiate collection of data regarding usage of stack space is a thread switch in which execution switches from one thread to another.

Device driver 318 may initiate a collection of data regarding the usage of stack space by threads by sending a request or command to profiler 320 in these examples. Profiler 320, in turn, collects the information about stack space usage from process stack space 300, process stack space 301, or from tables 326. Tables 326 are maintained by device driver 318 during the monitoring of threads 306, 308, 310, 312, and 314. Profiler 320 takes this information and generates statistical information that may be stored in stack usage database 324 in the form of records. Profiler 320 may send newly generated records to device driver 318 for analysis. Alternatively, device driver 318 may directly access information located in stack usage database 324.

Further, in response to receiving the data about stack usage, device driver 318 may initiate some action based on policy 328. Policy 328 is a set of rules that define what action should occur based on the data describing stack space usage in process stack space 300 and 301. In particular, the action is with respect to process stack space allocated for use by the different threads executing within a particular process.

For example, device driver 318 may selectively increase the size of the stack space for threads 306 and 308 within process stack space 300 and threads 310, 312, and 314 in process stack space 301, if these threads in processes 302 and 304 have used more than some percentage or more than a selected amount of space allocated for process stack space to them. In other words, the stack space allocated to a particular thread in the process stack space may be incremented if that thread has used stack space that meets or exceeds some criteria based on policy 328. Moreover, process stack space for individual threads may be reduced in size depending on the space usage when applying policy 328.

Additionally, device driver 318 may initiate an action to resize a stack space assigned to a thread based on a piece of code that is to be executed or stored. This action is initiated based on a comparison of the application, process or thread being started with respect to historical information about stack usage by those components in stack usage database 324. This historical information is applied to policy 328 to determine whether changes in stack space for a thread are needed for the particular component being started. An application may consist of multiple shared object libraries, which may allocate separate threads and the separate stacks. This application specific information may be recorded in stack usage database 324.

Alternatively, a set of profiles may be generated and stored in stack usage database 324. When a particular piece of code is to start execution, the profiles may be searched to determine whether the piece of code has an associated profile. If a profile is present for the piece of code, the amount of stack space is adjusted using that profile. Alternatively, if a particular profile does not match the piece of code, a default profile may be used. Additionally, the information in stack usage database 324 may be used to automatically adjust a piece of code, such as a program or process to cause the stack to be adjusted automatically when the code is executed.

Although the depicted examples illustrate functions being performed by device driver 318, these functions may be performed using other components, such as kernel 316. For example, kernel 316 may detect events, such as event 322 and initiate actions by sending calls to device driver 318.

Figure 4:
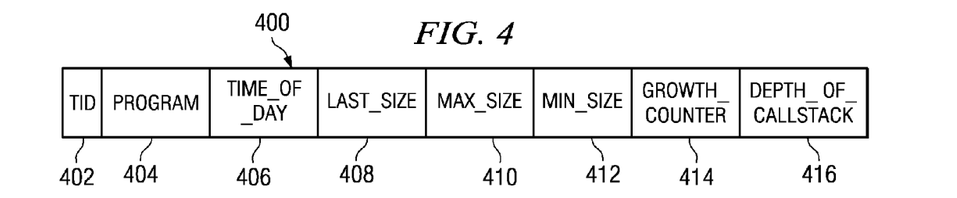
FIG. 4 is a diagram illustrating an example of data stored in stack usage database in accordance with an illustrative embodiment.

Turning now to FIG. 4, a diagram illustrating an example of data stored in stack usage database 324 in FIG. 3 is depicted in accordance with an illustrative embodiment. Record 400 is an example of data stored in stack usage database 324 in FIG. 3. In other embodiments, more or less information may be recorded. This information is collected from a stack, such as a stack for thread 306 in process stack space 300 in FIG. 3.

In these examples, the information is gathered by a software component, such as profiler 320 in FIG. 3. The information may be gathered from process stack space 300, process stack space 301, and/or tables 326 maintained by device driver 318, all of FIG. 3. The actual process stack space selected depends on a particular process in which a thread is executing. Profiler 320 in FIG. 3 analyzes and processes this information to create statistics as shown in record 400. In this particular example, record 400 includes TID field 402, Program field 404, Time_of_Day field 406, Last_Size field 408, Max_Size field 410, Min_Size field 412, Growth_counter field 414, and depth_of_callStack 416.

TID field 402 identifies the thread. Program field 404 identifies the program associated with the thread. Additionally, program field 404 may also identify locations in the program that create threads. These locations may include instructions that call the kernel interface to create a thread. Time_of_Day field 406 indicates the time when the stack was last used by the thread. Last_Size field 408 indicates the amount of space used in the stack by the thread the last time a context switch occurred. Max_Size field 410 indicates the maximum amount of space that has been used by the thread. Min_Size field 412 indicates the least amount of space used by a thread.

Growth_counter 414 is a counter that is incremented when the amount of space used by the thread increases. This counter also may be decremented if the amount of space is decreased. This counter may be used to increment the stack space for the thread if the counter increases at a rate that exceeds some threshold. The growth rate might also be used to identify the predicted amount of stack growth required for the stack extension or reallocation. Depth_of_callStack field 416 contains call stack information. This information may be used to identify who called who with respect to the thread. This information is found in the call stack portion of stack space for the thread.

Figure 5:
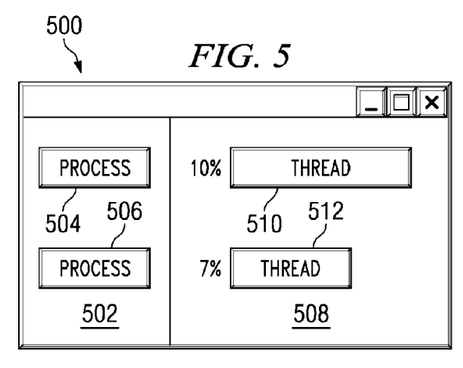
FIG. 5 is a diagram of a graphical user interface displaying the information about thread usage in accordance with an illustrative embodiment.

Turning now to FIG. 5, a diagram of a graphical user interface displaying the information about thread usage is depicted in accordance with an illustrative embodiment. In this example, window 500 displays processes that are running in section 502. In particular, section 502 displays process 504 and process 506. By selecting one of these processes, information about thread usage may be displayed in section 508. In this example, process 504 has been selected, which contains two threads.

The information about stack usage by these two threads is shown in bar 510 and bar 512 in section 508. In this example, the stack space usage shown in bar 510 is the use of stack space assigned to one thread, while bar 512 illustrates the stack space usage for stack space assigned to another thread. Bar 510 indicates that ten percent of one stack is being used by one thread for process 504. Bar 512 indicates that seven percent of a second stack is being used by the second thread for process 504. Of course, this information may be displayed in other ways depending on the implementation.

Figure 6:
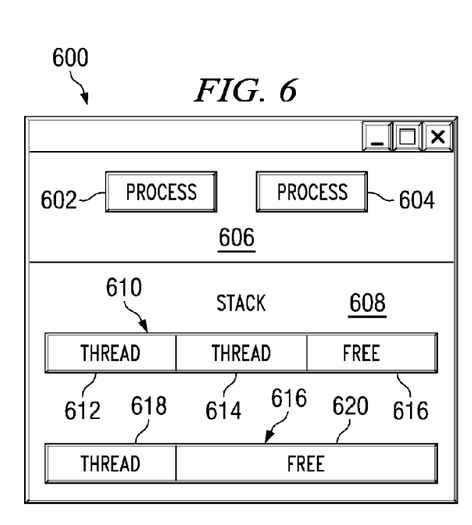
FIG. 6 is a diagram illustrating an alternative presentation of thread usage in accordance with an illustrative embodiment.

For example, FIG. 6 is a diagram illustrating an alternative presentation of thread usage in accordance with an illustrative embodiment. In this example, window 600 illustrates thread usage of a stack for different processes. Process 602 and process 604 are the processes executing and are displayed in section 606. In this particular embodiment, bar 610 indicates proportionally the usage of a process stack space for process 602.

Sections 612 and 614 in bar 610 indicate that two-thirds of the process stack space has been used up by two threads for process 602. Section 616 indicates that one-third of the stack space is still free and unused. Bar 616 indicates proportionally the usage of a process stack space assigned to process 604. In this example, section 618 indicates that one third of the process stack space has been used by one thread. Section 620 indicates that two thirds of the stack space is still free and unused in the process stack space.

Of course, other types of presentations may be made to indicate stack usage. For example, rather than using bars, a pie may be used to show percentages of stack space used by different threads and the percentage of free space.

Figure 7:
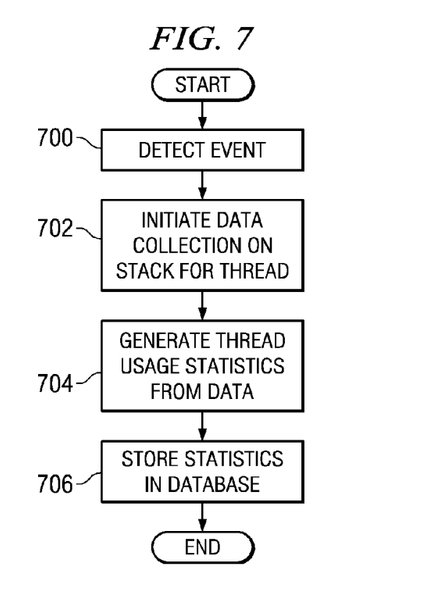
FIG. 7 is a flowchart of a process used to collect data to generate a history of stack space usage in accordance with an illustrative embodiment.

Turning now to FIG. 7, a flowchart of a process used to collect data to generate stack space usage data is depicted in accordance with an illustrative embodiment. The process illustrated in FIG. 7 may be implemented using software components, such as device driver 318 and profiler 320 in FIG. 3.

The process begins by detecting event (step 700). In these examples, the event is detected by a device driver. Thereafter, the process initiates data collection on the stack for a thread (step 702). This stack is the stack for the thread associated with the event. The device driver sends a message or call to the profiler to begin data collection. Next, thread usage statistics are generated from the data (step 704). In these examples, the data is collected from tables based on information monitored by the device driver. The profiler collects this data and generates statistics about stack space usage from the data.

Thereafter, the process stores the statistics in a database (step 706). In these examples, the database is, for example, stack usage database 324 in FIG. 3. This information may be used to determine a history of stack space usage by different applications. Further, the information stored may be used to determine whether adjustments are needed during the execution of threads.

Figure 8:
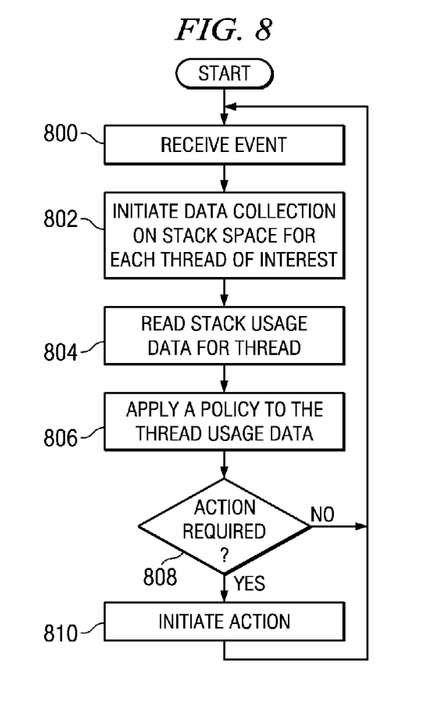
FIG. 8 is a flowchart of a process used to monitor stack space usage and initiate actions in accordance with an illustrative embodiment.

Turning now to FIG. 8, a flowchart of a process used to monitor stack space usage and initiate actions is depicted in accordance with an illustrative embodiment. The process illustrated in FIG. 8 may be implemented in a software component, such as device driver 318 in FIG. 3. The process begins by receiving an event (step 800). Next, data collection on a stack space for each thread of interest is initiated (step 802). The device driver sends a call or request to the profiler to collect data on the stack space usage for each thread of interest. This information is collected from tables generated by the device driver while monitoring the execution of processes and threads. The process then reads the stack usage data for threads (step 804). In step 804, the device driver may read the data from a database in which the profiler stores stack usage data. A policy is applied to the thread usage data (step 806). In step 806, the policy may be a rule that compares the stack usage to threshold. In another example, the policy may involve projecting a stack size that is appropriate for the thread of a particular application or process and comparing the actual stack size to the projected stack size. The action taken also is spelled out in the rules for the policy in these examples.

Then, a determination is made as to whether an action is required (step 808). The action may be with respect to one stack space for one thread or may be with respect to multiple stack spaces for different threads. If an action is required in step 808, an action is initiated (step 810) with the process returning to step 800 to receive an event. In step 810, the action may be, for example, increasing the stack space for a stack associated with a thread. If action is not required in step 808, the process returns to step 800 as described above.

Figure 9:
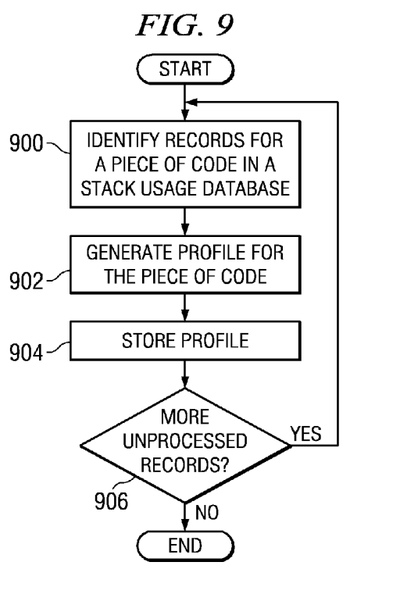
FIG. 9 is a flowchart of a process for generating profiles in accordance with an illustrative embodiment.

Turning to FIG. 9, a flowchart of a process for generating profiles is depicted in accordance with an illustrative embodiment. The process illustrated in FIG. 9 may be implemented in a software component, such as kernel 316 in FIG. 3. This process is employed to generate profiles to adjust stack space usage when a piece of code is to be executed. In these examples, the piece of code may be, for example, a program, a process or a thread.

The process begins by identifying records for a piece of code in a stack usage database (step 900). The stack usage database may be, for example, stack usage database 324 in FIG. 3.

A profile is generated from these records for the piece of code (step 902). In these examples, an identification of where threads are created in a program are located in the records. For example, a record may identify what dynamic link library or what other portion of code creates a thread for that program. With this information, modifications may be made to the program. This profile includes an identification of the piece of code and the amount of stack space required for the piece of code. This stack space may be more than one value depending on the particular implementation. For example, a number of different values for stack space may be identified for different times of the day, days of the week, days of the months, or even for different months.

The profile is then stored (step 904). In these examples, the file may be stored in stack usage database 324 or part of policy 328 in FIG. 3. Thereafter, a determination is made as to whether additional records are present that are unprocessed (step 906). If additional records are present, the process returns to step 900 to identify records for another piece of code, otherwise, the process terminates. This process also may be used to update profiles already created.

Figure 10:
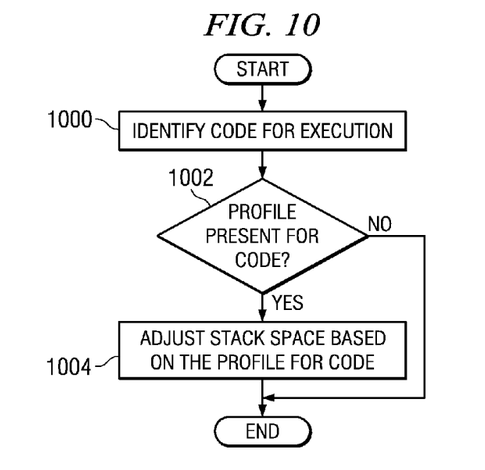
FIG. 10 is a flowchart of a process used to adjust stack space on a selective basis depending on the particular process that is to begin execution in accordance with an illustrative embodiment.

With reference next to FIG. 10, a flowchart of a process used to adjust stack space on a selective basis depending on the particular process that is to begin execution is depicted in accordance with an illustrative embodiment. The process illustrated in FIG. 10 may be implemented in a software component, such as kernel 316 in FIG. 3.

The process begins by identifying code for execution (step 1000). This step may occur at the time the code is loaded and a loaded module event, such as, event 322 is sent to a device driver. Next, a determination is made as to whether a profile is present for the identified code (step 1002). In these examples, a profile may include, for example, identification of the application and its processes, and an amount of space required for use by the processes. The profile also may be, for example, a profile that is based on time rather than on the particular code being executed. For example, if a new program is initiated between 3:00 and 4:00 p.m., the profile may indicate that, for that particular period of time, a certain amount of stack space is required when execution begins during that period of time. As a result, the profile may result in stack space being increased. If the same program is executed during a different period of time, additional stack space may not be needed as indicated by the profile. If a profile is present in step 1002, stack space is adjusted based on the profile for the identified code (step 1004).

The adjustment of the stack space may be made by comparing the current amount of stack space available for use with the stack space identified in the profile. If additional stack space is needed to take into account the stack space identified in the profile, the size of the stack may be increased to provide more stack space. Further, the adjustment could be to decrease the amount of stack space if excess of stack space is present taking into account the stack space usage in the profile. The process terminates thereafter. If the process determines a profile is not present in step 1002, the process terminates.

The flowchart illustrated in FIG. 10 is directed towards adjusting stack space usage when a piece of code is started. The piece of code may be, for example, a program, a process, or a thread. As an alternative to terminating the process in step 1004, a default profile may be used depending on the particular implementation. The profile also may specify different amounts of stack space needed depending on a particular time or date.

Figure 11:
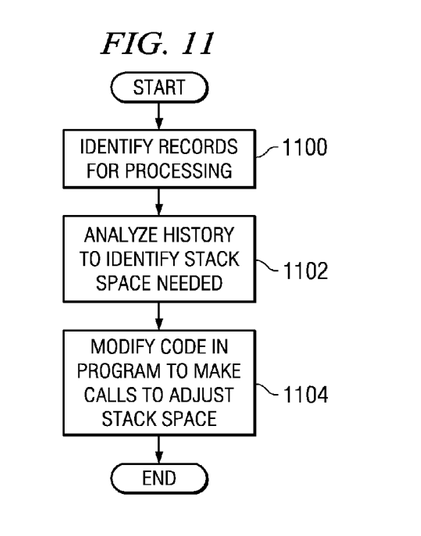
FIG. 11 is a flowchart of a process for adjusting code in a program in accordance with an illustrative embodiment.

With reference next to FIG. 11, a flowchart of a process for adjusting code in a program is depicted in accordance with an illustrative embodiment. This process illustrated in FIG. 11 may be implemented using an application that has access to stack usage database 324 in FIG. 3.

The process begins by identifying records for a selected program for processing (step 1100). These records are ones found in stack usage database 324 in FIG. 3. Records may be present for different processes and threads for the program. The history of usage is analyzed to identify the stack space needed by the program (step 1102). Thereafter, the code in the program is modified to make the appropriate calls needed to adjust the amount of stack space (step 1104) with the process terminating thereafter.

In this manner, the process illustrated in FIG. 11 may be used to modify programs that need additional stack space. The proper stack size may be allocated as needed by the program, when the program executes.

Thus, the illustrative embodiments provide a computer implemented method, apparatus, and computer usable program code for managing a stack. The usage of stack space in a stack is monitored for threads. The usage of stack space is compared to a policy to form comparison. An action is selectively initiated based on the comparison to prevent usage of all of the stack space.

In this manner, the different embodiments are used to manage a stack in a manner that prevents or avoids the complete usage of the stack space. These embodiments provide an improvement over currently used processes, which only indicate a problem is present when stack space has been completely used. The different embodiments recognize that by avoiding complete usage of the stack space, problems, such as errors in results and slow down in possessing may be avoided. Additionally, the depicted embodiments illustrate the management of stack space on a thread level. In other words, the stack space is managed for the stack space assigned to a thread. The different illustrative embodiments also may be applied to managing stack space assigned to a process, such as processor stack space 300 and 301 in FIG. 3.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) storage medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing stack space, the computer implemented method comprising:
   responsive to detecting an event, monitoring usage of stack space for a plurality of threads, the stack space being dedicated to a particular process that includes the plurality of threads;
   comparing the usage of stack space for the plurality of threads to a policy to form a comparison, wherein the policy comprises a set of rules that specify what actions to take depending upon the usage of the stack space; and
   selectively initiating an action based on the comparison prior to all of the stack space being used to prevent usage of all of the stack space;
   wherein the stack space includes a particular stack space for a thread of the plurality of threads, and wherein a rule of the set of rules states that the particular stack space should be increased in size if particular usage of the particular stack space for the thread exceeds a certain percentage of the stack space; and
   wherein the initiating step comprises determining whether the action is required to prevent complete usage of the stack space based on the comparison and, responsive to a determination that the action is required, commencing the action by a device driver that initiates a collection of data regarding the usage of the stack space for the plurality of threads, wherein the commencing step comprises increasing a size of the particular stack space for the thread by a given amount based on a current time of day.

2. The computer implemented method of claim 1, wherein the event is dispatching a thread of the plurality of threads, and wherein the monitoring step comprises:
   profiling the thread by determining an amount of the stack space used by the thread, and using the profiling to generate the policy.

3. The computer implemented method of claim 2, wherein the initiating step comprises:
   transfer processing to a program that prevents the usage of all of the stack space.

4. The computer implemented method of claim 1, wherein the comparing step comprises:
   comparing a usage of a particular stack space assigned to a particular thread in the plurality of threads to the policy to form the comparison.

5. The computer implemented method of claim 1 further comprising:
   decreasing a size of the stack space assigned to the thread in response to the comparison.

6. The computer implemented method of claim 1, wherein the monitoring step comprises:
   responsive to the event, initiating collection of information on thread usage in the stack space of a thread associated with the event;
   generating thread usage statistics from the information; and
   storing the thread usage statistics in a database.

7. The computer implemented method of claim 6, wherein the thread usage statistics comprises a plurality of records, and each record of the plurality of records comprises a thread identifier field that identifies a particular thread associated with the record, a program field that identifies a computer program associated with the particular thread, and a growth counter field that is adjusted upward and downward when an amount of space assigned to an associated stack space that is associated with the particular thread is adjusted upward and downward, respectively.

8. The computer implemented method of claim 1, wherein the comparing step comprises:
   determining whether the usage of stack space has met a threshold criteria.

9. The computer implemented method of claim 1, wherein the comparing step comprises:
   determining whether the usage of stack space meets a usage pattern.

10. The computer implemented method of claim 1 further comprising:
    responsive to identifying a piece of code for execution, identifying a profile for the piece of code to form an identified profile, wherein the identified profile comprises an identification of an application and its processes, and an amount of process stack space required for use by each of the processes;
    adjusting a size of the stack space based on the identified profile; and
    starting execution of the piece of code.

11. The computer implemented method of claim 10, wherein the piece of code is one of a program, process, or thread.

12. The computer implemented method of claim 10, wherein the adjusting step comprises:
    modifying the piece of code using the identified profile to form modified code, wherein the modified code is modified to include instructions to adjust the stack space to take into account an amount of stack space needed by the modified code when the modified code is executed.

13. The computer implemented method of claim 1 further comprising:
    presenting a graphical display of information about the usage of stack space, wherein the graphical display provides data about processes and threads associated with each process of the processes, wherein an amount of the usage of stack space assigned for each thread associated with a given process of the processes is presented when the given process is selected.

14. A computer program product comprising:

a non-transitory computer usable storage medium having computer usable program code stored thereon for managing stack space, the computer program product comprising:

computer usable program code for monitoring usage of stack space for a plurality of threads, the stack space being dedicated to a particular process that includes the plurality of threads;

computer usable program code for comparing the usage of stack space for the plurality of threads to a policy to form a comparison, wherein the policy comprises a set of rules that specify what actions to take depending upon the usage of the stack space; and computer usable program code for selectively initiating an action based on the comparison prior to all of the stack space being used to prevent usage of all of the stack space;

wherein the stack space includes a particular stack space for a thread of the plurality of threads, and wherein a rule of the set of rules states that the particular stack space should be increased in size if particular usage of the particular stack space for the thread exceeds a certain percentage of the stack space; and wherein the computer usable program code for initiating an action comprises computer usable program code for determining whether the action is required to prevent complete usage of the stack space based on the comparison and, responsive to a determination that the action is required, commencing the action by a device driver that initiates a collection of data regarding the usage of the stack space for the plurality of threads, wherein the computer usable program code for commencing the action comprises computer usable program code for increasing a size of the particular stack space for the thread by a given amount based on a current time of day.

15. The computer program product of claim 14, further comprising:

computer usable program code for profiling the thread by determining an amount of the stack space used by the thread, and using the profiling to generate the policy.

16. The computer program product of claim 15, wherein the computer usable program code for comparing the usage of stack space for the plurality of threads to a policy to form a comparison comprises:

computer usable program code for comparing a usage of a particular stack space assigned to a particular thread in the plurality of threads to the policy to form the comparison.

17. The computer program product of claim 15, wherein the computer usable program code, responsive to a determination that the action is required, for commencing the action, further comprises:

computer usable program code for increasing a size of the particular stack space for the thread.

18. A data processing system comprising:

a bus;

a communications unit connected to the bus;

a storage device connected to the bus, wherein the storage device includes computer usable program code; and a processor unit connected to the bus, wherein the processor unit executes the computer usable program code to monitor usage of stack space for a plurality of threads, the stack space being dedicated to a particular process that includes the plurality of threads; compare the usage of stack space for the plurality of threads to a policy to form a comparison, wherein the policy comprises a set of rules that specify what actions to take depending upon the usage of the stack space; and selectively initiate an action based on the comparison prior to all of the stack space being used to prevent usage of all of the stack space; wherein the stack space includes a particular stack space for a thread of the plurality of threads, and wherein a rule of the set of rules states that the particular stack space should be increased in size if particular usage of the particular stack space for the thread exceeds a certain percentage of the stack space, wherein the program code to initiate the action comprises program code to determine whether the action is required to prevent complete usage of the stack space based on the comparison and, responsive to a determination that the action is required, commence the action by a device driver that initiates a collection of data regarding the usage of the stack space for the plurality of threads, wherein the program code to commence the action comprises program code to increase a size of the particular stack space for the thread by a given amount based on a current time of day.

* * * * *